United States Patent [19]

Miller

[11] 4,279,195
[45] Jul. 21, 1981

[54] COLLAPSIBLE LAUNCHING SYSTEM

[75] Inventor: Matthew N. Miller, Woodland Hills, Calif.

[73] Assignee: Fairchild Industries, Inc., Germantown, Md.

[21] Appl. No.: 972,275

[22] Filed: Dec. 22, 1978

[51] Int. Cl.$^3$ .............................................. F01B 29/00
[52] U.S. Cl. ......................................... 92/88; 92/128; 92/151; 244/63
[58] Field of Search ................... 92/88, 151, 128, 118, 92/165 PR; 244/63

[56] References Cited

U.S. PATENT DOCUMENTS

| | | | |
|---|---|---|---|
| 2,485,601 | 10/1949 | Hickman | 92/88 |
| 2,686,497 | 8/1954 | Dooley . | |
| 3,385,172 | 5/1968 | Kaminga | 92/151 |
| 3,435,725 | 4/1969 | Miller . | |
| 3,524,381 | 8/1970 | Miller . | |
| 4,079,901 | 3/1978 | Mayhew . | |

*Primary Examiner*—Abraham Hershkovitz
*Attorney, Agent, or Firm*—Michael W. York

[57] ABSTRACT

A fluid pressure actuated launching system for aircraft or other articles having a piston assembly with an exterior portion that engages the aircraft or article to be launched and an interior portion disposed within and adapted to move within a plurality of connected cylinders to provide a long working stroke and controlled acceleration of the piston and article to be launched. The cylinders are hinged to one another so that the launching system is collapsible to form a compact unit and facilitate portability and ready accommodation on a launch vehicle of limited size. The cylinders are provided with a longitudinal slot to permit passage of a web between the exterior and interior portions of the piston assembly. The slot is adapted to be sealed by a tensioned flexible closure ribbon that is operatively connected to the piston assembly and is restrained at both ends so that it does not travel. As the piston travels within the cylinder, the closure ribbon passes through a cavity in the piston assembly that guides the ribbon away from its sealing engagement with the cylinders as the piston moves. The fluid pressure may be applied to the cylinder at one end to drive the piston during the launch stroke and at the opposite end to return the piston assembly. The closure ribbon tensioning means may be selectively operated to permit one end of the closure ribbon to be unfettered and thereby enable the cylinders to be folded on their hinges to form a compact unit while re-engagement of the closure ribbon tensioning means may be quickly restored when the cylinders are again opened to the operational launch position.

7 Claims, 8 Drawing Figures

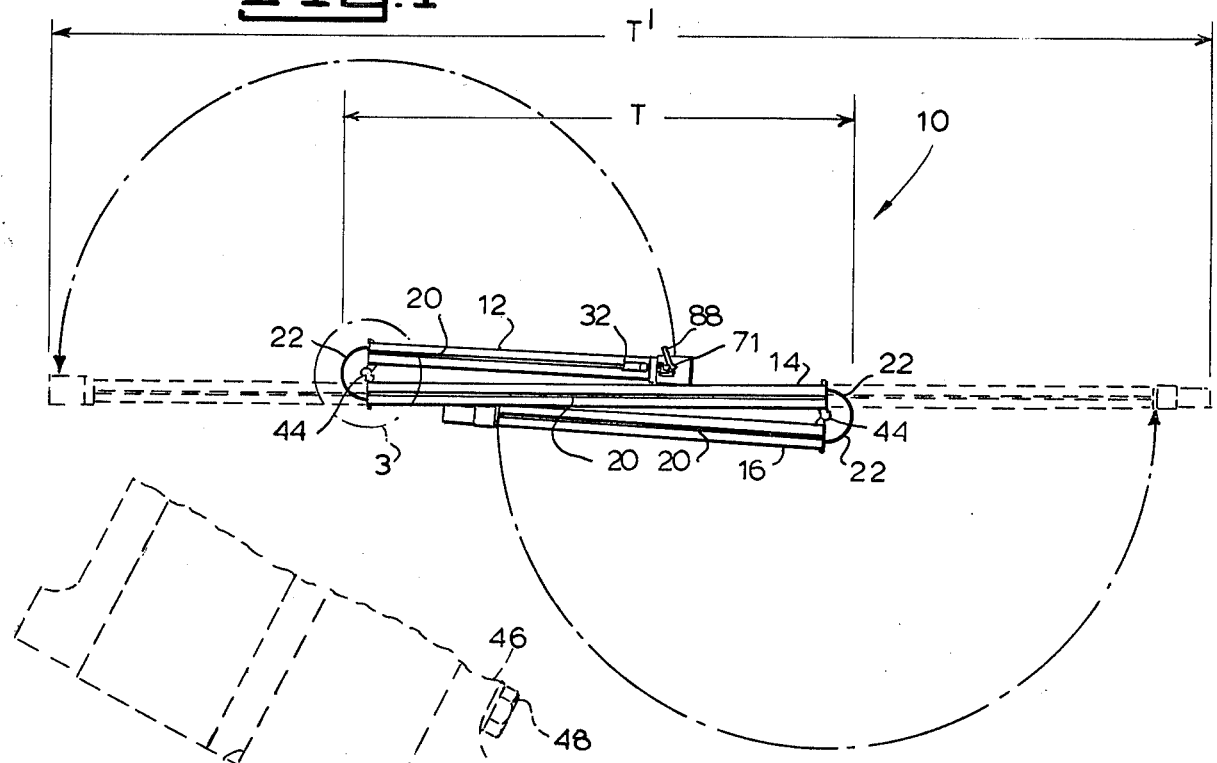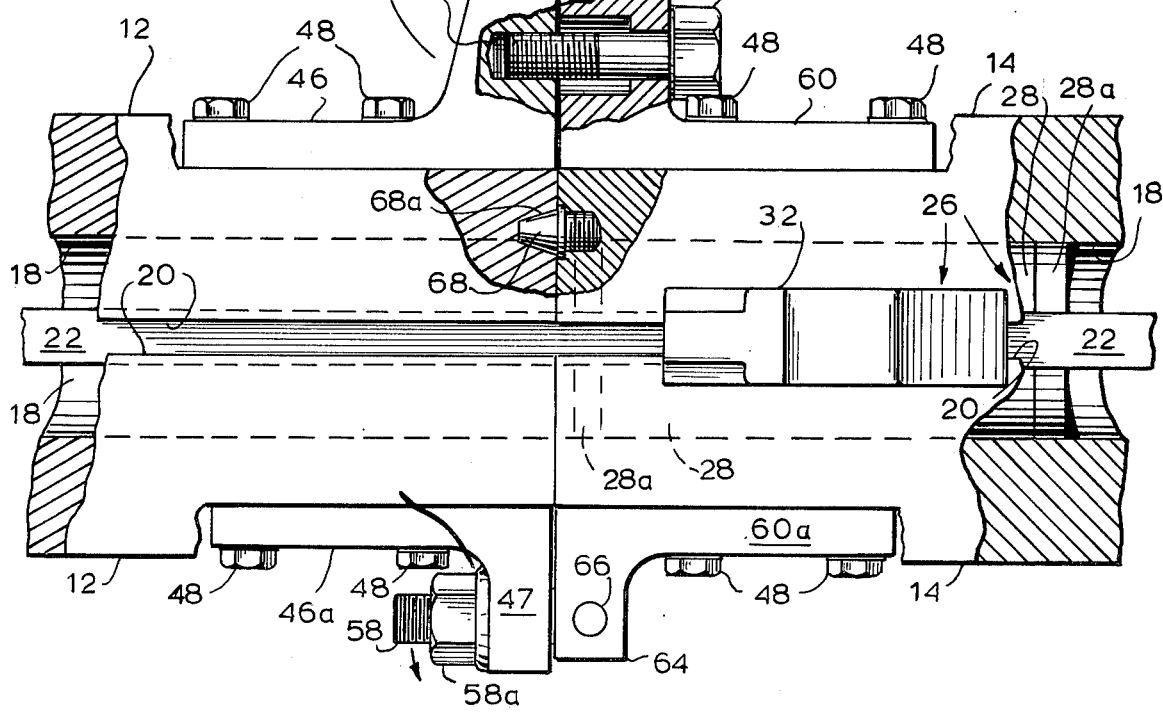

COLLAPSIBLE LAUNCHING SYSTEM

BACKGROUND OF THE INVENTION

Fluid pressure actuated devices of the type shown and described in U.S. Pats. Nos. 2686497 and 3524381 have become well known and widely used in a variety of diverse arts and applications and have enjoyed widespread acceptance because of their efficient trouble-free operation, long life and inherent compactness. As an example, this type of fluid pressure actuator has been used to automatically operate doors and similar devices as well as in more exotic and sophisticated devices such as launching and ejection systems as illustrated in the latter of the above mentioned patents, to eject or discharge various stores and types of ordinance. The advantages contributing to the popularity of these types of actuating device as indicated above, as well as others with which we will become more familiar as we progress, are largely attributable to their relatively low cost, proven reliability and flawless operation with little or no supportive maintenance. Moreover, actuating devices of this type can be accommodated in a minimum of space since unlike many other types of fluid pressure actuating devices, its working stroke can approximate its overall length.

Recent concern with the development of launching systems suited to the unique characteristics required for the launching of aircraft and in particular, a recent emphasis on more widespread use and deployment of piloted or drone aircraft, missiles and similar devices, have brought into sharper focus a more pressing need for suitable launching devices. Of necessity, such launching systems require a substantially long working stroke in order to have the ability to produce the desired acceleration within the prescribed G loading limits that can be safely accommodated by the structure of the aircraft or missile that is to be launched. In addition, since it is often desirable to launch such aircraft or missiles from different or varying locations, such launching systems must be capable of transport to different launch locations.

For the most part prior art launching mechanisms because of the aforementioned requirements, have been large and unwieldy and have incorporated relatively sophisticated if not complex subsystems and components in order to make them reasonably portable. Moreover, these complex launching systems usually require a considerable amount of skilled manpower in order to adequately set them up for operation, check them out and ultimately dismantle the launching systems when it becomes necessary to move them to an alternative location.

SUMMARY OF THE INVENTION

This invention relates to launching systems and more particularly to a compact fluid pressure actuated launching system that is readily portable while retaining the capability of producing a substantially long working stroke.

Accordingly, it is an object of the present invention to provide a fluid pressure actuated launching system that may be readily extended to facilitate its operation and produce a launching stroke that is substantially greater than the launching system in its portable mode.

It is another object of the present invention to provide a fluid pressure actuated launching system that is simple in design and operation and which may be economically manufactured.

It is another object of the present invention to provide a readily portable and extendible fluid pressure actuated launching system which requires minimal skill and dexterity to set up, operate and fold to a compact dimension for easy and rapid portability.

It is an additional object of the present invention to provide such a fluid pressure actuated system that is comparatively lightweight, transportable and readily accommodated and operable from a variety of transporting vehicles.

According to the present invention, the foregoing and other objects are attained by providing a fluid pressure actuated launching system including a plurality of cylinder members each having a longitudinal opening therewithin. A longitudinal slot communicates with the opening within the cylinders. Hinge means are provided between and connect adjacent cylinder members so that multiple cylinder members can be contiguously positioned end to end so that the longitudinal slots and openings therewith in form a substantially continuous longitudinal slot and opening therewithin. A tensioned closure means is provided to seal portions of the longitudinal slow with means provided to selectively relieve the tension of the closure means. A linearly movable piston assembly, movable during the launch and return stroke is disposed within the longitudinal opening of a cylinder member and is operably connected to the closure means. The piston assembly has an exterior portion that is integral with the interior portion within the longitudinal opening and extends through the longitudinal slot. The exterior portion of the piston assembly is adapted to engage the aircraft or article to be launched from the launching system.

BRIEF DESCRIPTION OF THE DRAWINGS

The invention will be hereinafter more fully described with reference to the accompanying drawings in which:

FIG. 1 is a top plan view of the fluid pressure actuated launching system shown in its folded transport mode and in dotted lines in its extended operational launching mode;

FIG. 3 is an enlarged fragmentary top plan view partly in section of that portion of the fluid pressure actuated launching system which lies within the circle 3 in FIG. 1 and showing the relationship of the components when the launching system is in the operational launching mode;

DETAILED DESCRIPTION OF THE PREFERRED EMBODIMENTS

Figure 4:
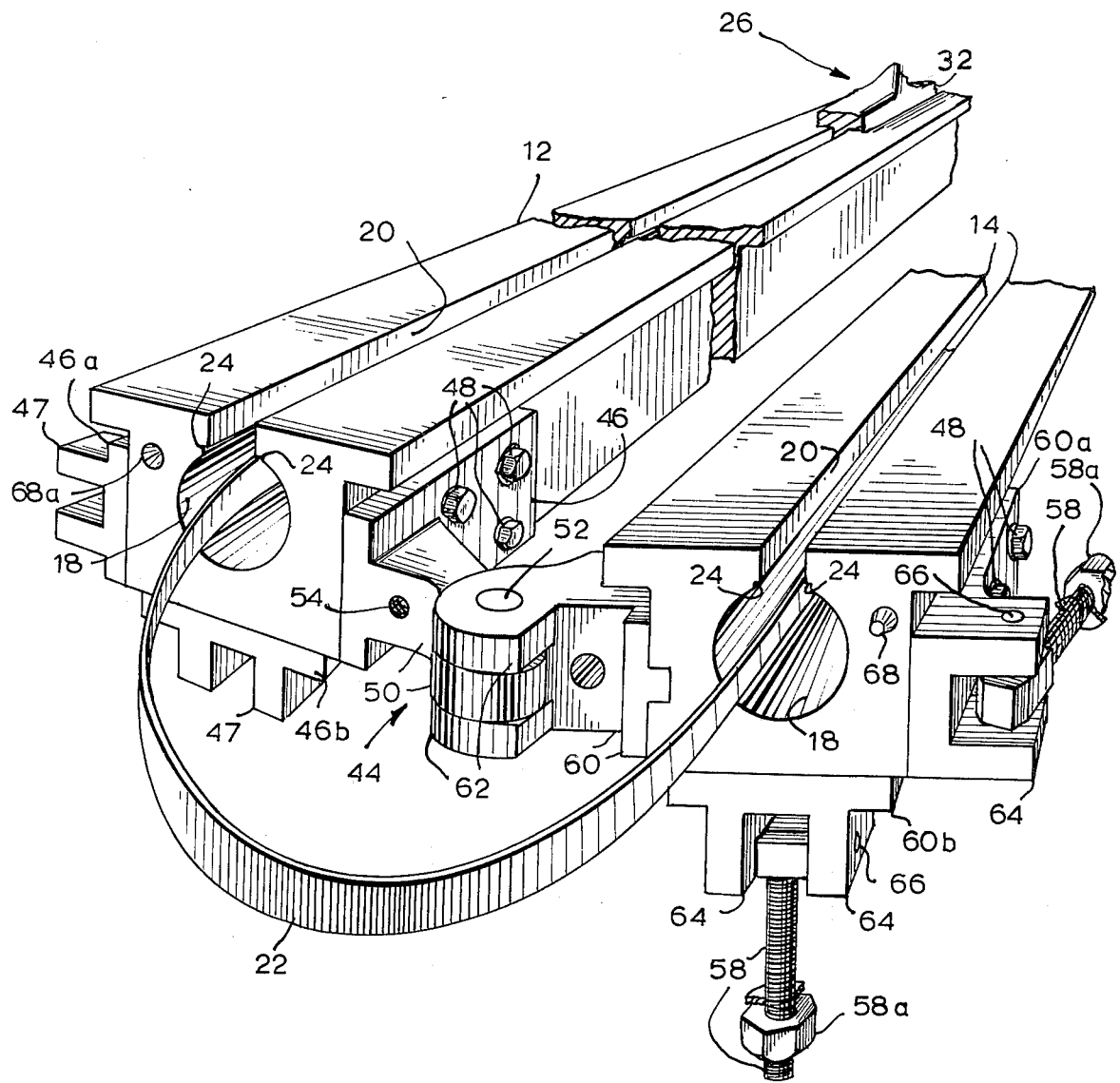
FIG. 4 is an enlarged perspective view of a portion of the launching system shown in the previous figures illustrating a typical hinge arrangement connecting adjacent cylinder members and showing the disposition of the closure means when the launching system is in its folded mode.
Figure 5:
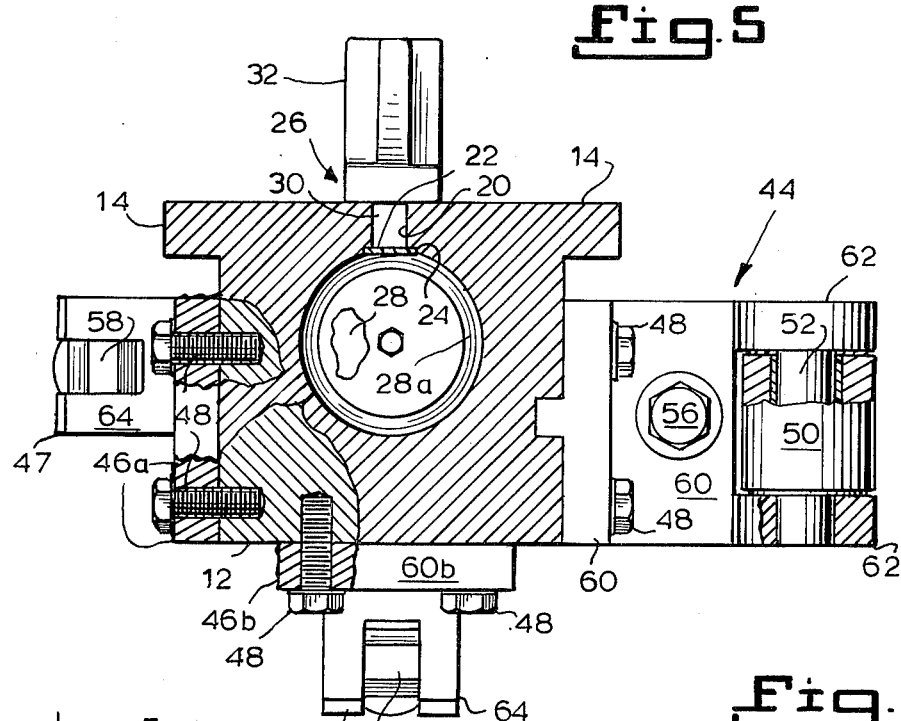
FIG. 5 is a sectional view of one of the cylinder members taken on the line 5—5 in FIG. 6 and showing a portion of an adjacent cylinder member of the fluid operated launching system shown in the previous figures, positioned in the operational launching mode.

If reference is made to FIG. 1 in the drawings, it will be noted that a fluid pressure operated launching system, in accordance with the teachings of the present invention, has been generally designated by the reference numeral 10. In the present embodiment, the launching system 10 includes three hingedly connected elongated cylinder members designated by the reference numerals 12, 14 and 16. Each of these cylinder members are provided with an opening in the form of a longitudinally disposed interior bore 18 as best seen in FIGS. 3, 4 and 5 in the drawings. These cylinder members 12, 14 and 16 may be of similar or varying lengths dependent primarily upon the requirements of a particular application or arrangement which will be better understood and appreciated as we progress.

Figure 2:
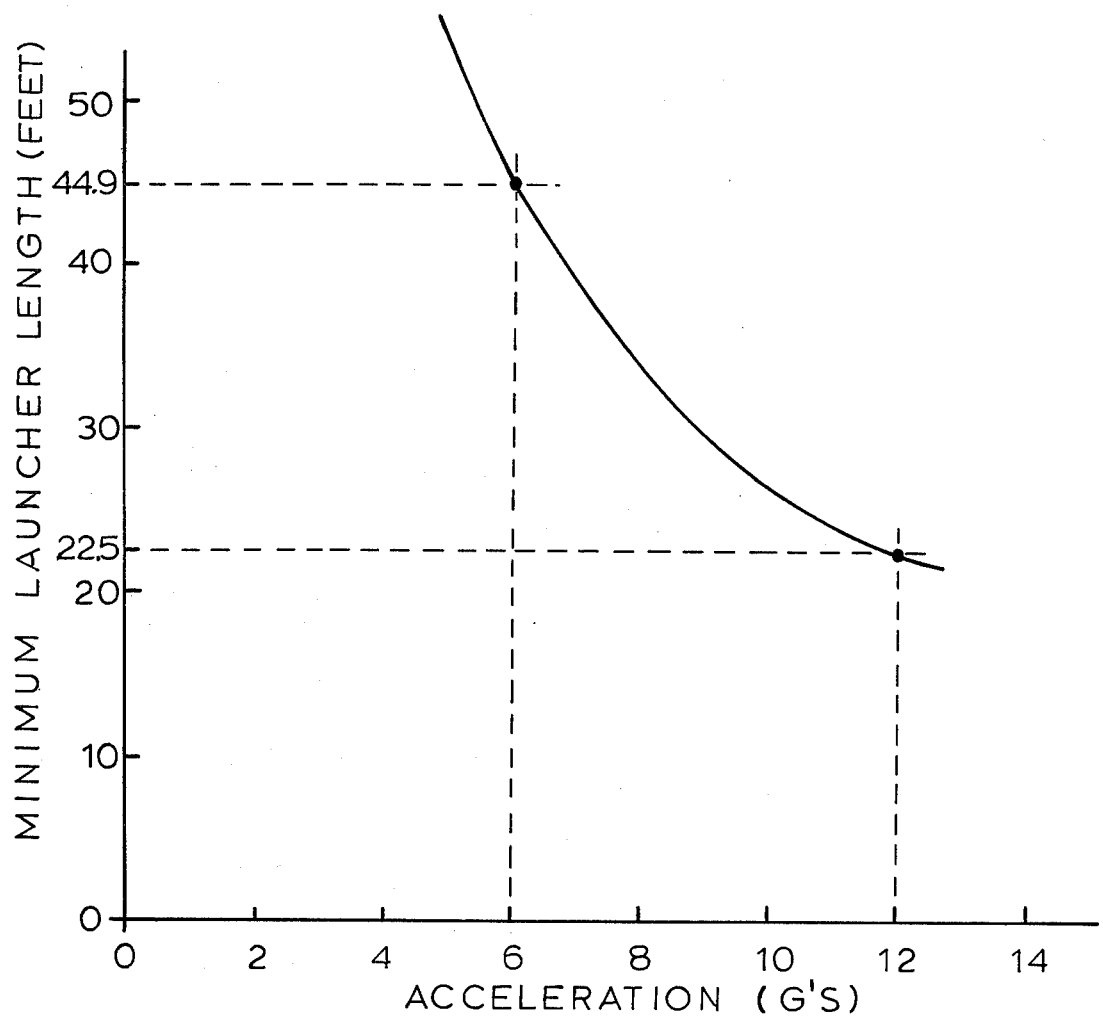
FIG. 2 is a diagram and curve based upon the known laws of motion illustrating the parameters utilized to select the optimum length of the fluid pressure actuated launching system to FIG. 1 in accordance with the teachings of the present invention.

As is indicated and most apparent in FIG. 1, the cylinder members 12, 14 and 16 of the launching system 10 are readily portable and most compact in the folded position illustrated in solid lines. The total length T of the folded launching system 10 as shown in FIG. 1 can be enlarged or diminished according to the desired compactness that could be dictated by the space allotted or available to accommodate the launching system 10 at a given site or on a particular transporting vehicle. In addition, the total extended length $T^1$, the dotted line position in FIG. 1, is usually determined by the acceleration and loading parameters that can be safely imposed upon the articles that are to be launched from the launching system 10. As a consequence, required launch velocity, allowed acceleration and launcher length are inextricably tied together in accordance with the following:
where
 V=velocity, ft./sec.
 a=acceleration, ft./sec./sec.
 S=stroke, ft.
then
 $V^2 = 2a \times S$ The launching system of the present invention may then be fabricated in any length required to meet the combination of imposed criteria in a given application. In this connection if reference is made to FIG. 2, various positions on the curve can be translated to provide a relative indication of the required launcher length according to acceleration loads. In referring to this FIGURE, it becomes obvious that the lower the tolerance of the article to be launched to acceleration loads, the greater the length requirement for the launching system. However, regardless of the required length of the launching system needed, compactness and ease of portability can readily be obtained by increasing either the number or length of the cylinder members 12, 14 and 16. In either case and as best seen in FIG. 1, the cylinder members in a particular arrangement of the present launching system, however many in number or of whatever length as may be required, would be readily adaptable to be extended to the operative launching (dotted line) position having an extremely generous operating stroke while retaining its ability to assume a compact configuration for ease of portability and accommodation. The aforementioned interior bore 18 within each of the cylinder members 12, 14 and 16 is of the same diameter in each of the respective hingedly connected cylinder members so that when the cylinder members are disposed in the open or launching mode corresponding to the dotted line position in FIG. 1, the respective interior bore 18 in each of the individual cylinder members 12, 14 and 16 will form a contiguous longitudinal opening or bore 18 that extends for substantially the entire length of the launching system 10.

As illustrated in the drawings and as best seen in FIG. 3, longitudinal slot 20 is formed in the upper region of each of the cylinder members 12, 14 and 16 and communicates with the interior bore 18 in each of the respective cylinder members 12, 14 and 16. A continuous, substantially flat metallic strip, hereinafter called a closure ribbon 22 is normally maintained under tension in a manner which will be more fully described as we progress, when the launching system 10 is in its operational launching mode. The closure ribbon 22 is adapted to cooperate with a bearing surface formed by a relieved portion 24 that is provided on each side of the aforementioned longitudinal slot 20 that communicates with the exterior of the cylinder members 12, 14 and 16 and the interior bore 18 to provide a fluid tight seal between the contiguous interior bores 18 and the exterior of the cylinder member 12, 14 and 16.

Figure 6:
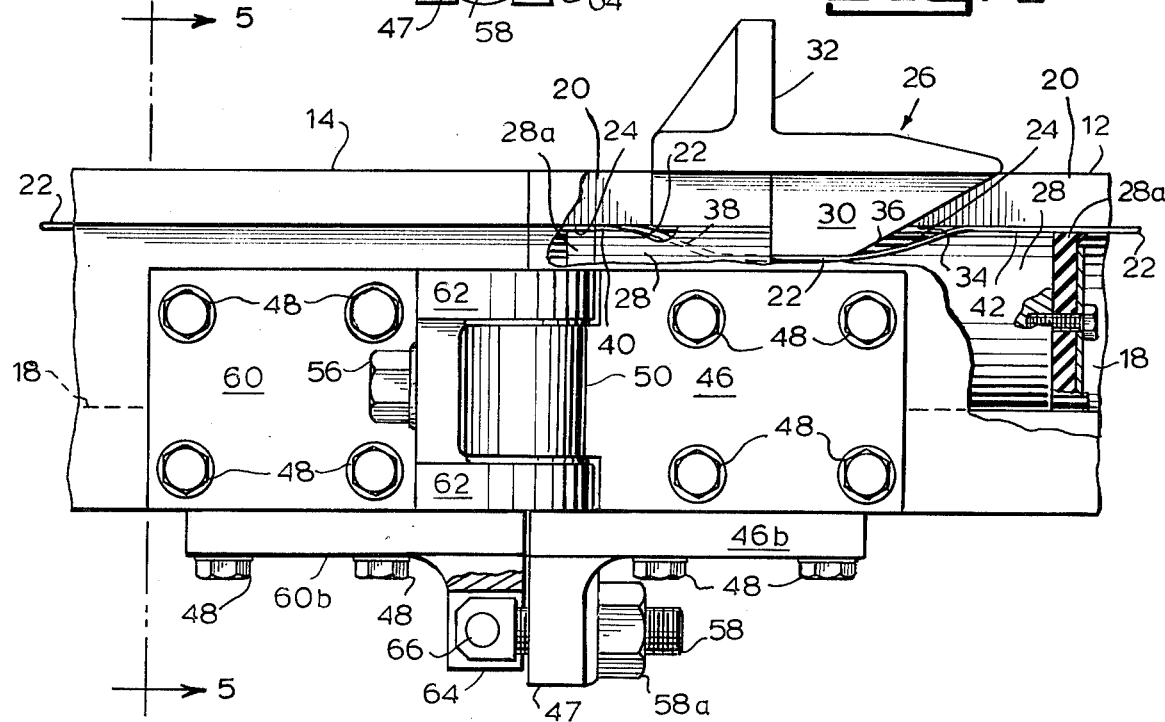
FIG. 6 is a fragmentary side elevation partly in section of a portion of the launching system shown in the previous figures and showing in particular, details of the closure means and piston within a cylinder member.

A piston assembly 26 best seen in FIGS. 5 & 6 includes a confined portion 28, a web 30 and an extending or exterior portion 32. Web 30 extends through the slot 20 and holds the extending or exterior portion 32 integrally with the confined portion 28 of the piston assembly 26. The aforementioned closure ribbon 22 extends into a cavity 34 that is provided within the confined portion 28 of the piston assembly 26 and is guided internally of the confined portion 28 by shoulders 36 and 38 having rounded surfaces that are in contact with the upper surface of the closure ribbon 22. A pair of aligned flat surfaces 40 and 42 are provided in the confined portion 28 of the piston assembly 26 to further guide and bias the closure ribbon 22 against the aforementined bearing surfaces provided by the relieved portion 24 on each side of the longitudinal slot 20. In this manner, a fluid tight seal between the internal bore 18 and slot 20 is established and maintained despite movement of the piston assembly 26 along cylinder member 12, 14 and 16, the shoulders 36 and 38 sliding along the top of the ribbon 22 to deflect and guide the closure ribbon through the piston assembly 26 during such movement. Resilient cup seals 28a fastened to each end of the confined portion 28 of the piston assembly 26 prevent blowby past the confined portion 28.

The fluid pressure actuated launching system is operated in the conventional and well known manner. That is to say fluid pressure is introduced by the interior bore 18 where it is prevented from escaping through the slot 20 by the sealing engagement of the closure ribbon 22 with the relieved portion 24. The fluid pressure is exerted against one side of the piston assembly 26 driving the piston assembly 26 and the article to be launched (not shown) which engages the projection provided on the exterior portion 32. It should be noted that in the present embodiment, each of the aforementioned cylinder members are configured with a relatively flat, rail like upper surface which can be utilized to guide and/or support an aircraft or any other type of article (not shown) that is to be launched from the launching system 10. As the piston assembly approximates the end of the stroke, suitable well known valving (not shown) may be employed to retard the piston and bring it to a halt as well as to pressurize the other side of the piston assembly 26 to return it to the start position for another operational cycle. It should be noted that an external pressure line (not shown) is often utilized as a conduit for the return fluid pressure and since operation of these fluid pressure actuated devices is well known to those skilled in the art, a further detailed discussion is not required herein.

Hinge means 44 connecting each of the aforementioned cylinder member 12, 14 and 16 is shown in FIGS. 1, 3, 4, 5 and 6. It should be understood that in accordance with the teachings of the present invention, such hinge means would be utilized to operatively connect each cylinder member with an adjacent cylinder member so that in alternative embodiments wherein there may be fewer or a greater number of cylinder members employed, a correspondingly fewer or greater number of hinges 44 would be employed. However, since all of the hinge means employed would be identical, the foregoing detailed description of the hinge means connecting the cylinder members 12 and 14 will suffice with the understanding that an additional and identical hinge means 44 also connects cylinder members 14 and 16 in the present embodiment To facilitate mounting of the hinge means 44, the cylinder member 12 is provided with hinge plates 46, 46a and 46b which are fixed thereto by a plurality of bolts 48 that are threaded into the body of the cylinder member 12 in a conventional manner. The hinge plate 46 is provided with a protruding ear like member 50 which contains a journal (not shown) to receive a hinge pin 52 as best seen in FIGS. 3 and 4. The member 50 also contains a threaded hole 54 that is coaxial to the interior bore 18 of the cylinder member and adapted to receive a retaining bolt 56 which serves to fasten and hold the adjacent cylinder members 12 and 14 in the operational launch mode as viewed in FIG. 3.

Hinge plates 46a and 46b are disposed respectively on the opposite side and underside of the cylinder member 12 and are similar and provided with bifurcated ear like protuberances 47 that are each adapted to accommodate one end of separate swing bolts 58 attached to the adjacent cylinder member 14. Similarly, the cylinder member 14 is provided with hinge plates 60, 60a and 60b. Hinge plate 60 is equipped with a bifurcated ear like protuberance 62 which straddles the aforementioned member 50 extending from the hinge plate 46 on the cylinder member 12 and accommodates the aforementioned hinge pin 52 to form the hinged connection between the cylinder members 12 and 14.

Hinge plate 60a located on the opposite side of the cylinder member 14 relative to the hinge plate 60 and hinge plate 60b located on the underside of the cylinder member 14 are each equipped with bifurcated ear like protuberances 64 to each accommodate one end of the aforementioned swing bolts 58. As will be noted in FIGS. 3 and 4, each of the swing bolts 58 is received between the bifurcated protuberances 64 and pivotably secured thereto by a pivot pin 66 which passes through each of the protuberances 64 and the head of each swing bolt 58. The opposite end of each swing bolt is equipped with a hex nut 58a threadably engaged with the swing bolt 58 such that when the hinged cylinder members 12 and 14 are brought into juxtaposition, the swing bolts 58 may be swung between the bifurcated protuberances 47 and the hex nut 58a tightened against the protuberance to firmly hold the cylinder members 12 and 14 in place. The aforementioned retaining bolt 56 in threaded engagement with the threaded hole 54 will assure that the cylinder members will be locked in place.

In addition, adjacent cylinder members 12 and 14 and 16 may be equipped with a suitable alignment device such as the tapered alignment pin 68 shown fixed to the mating face of the cylinder member 14 and a correspondingly tapered apperture 68a provided on the mating face of the cylinder member 12 as best viewed in FIGS. 3 and 4. Such an arrangement assure that the longitudinal axis of each of the cylinder members 12, 14 and 16 will coincide when the cylinder members are opened to the operational launch position despite any inaccuracies that may occur in the hinge means 44 either from reduced manufacturing tolerances, wear or excessive play between the hinge components.

Figure 7:
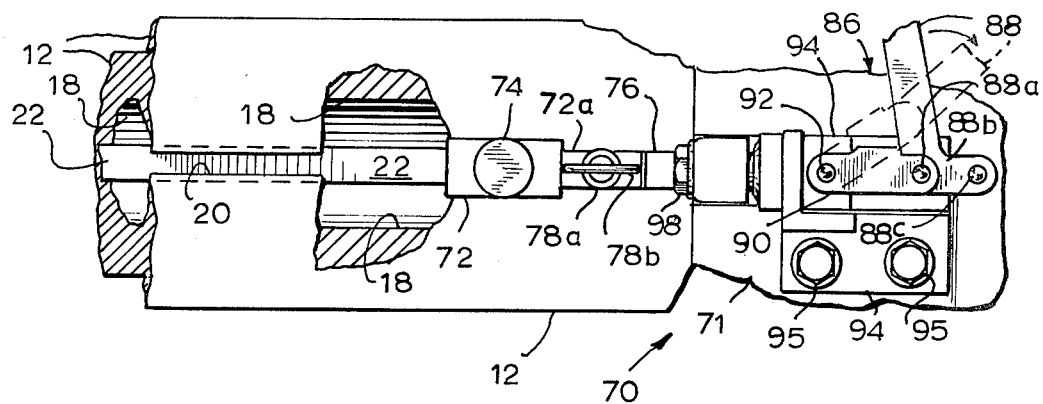
FIG. 7 is an enlarged top plan view of the tensioning and tension relieving mechanism operatively connected to the closure means and a cylinder member of the launching system shown in the previous figures.
Figure 8:
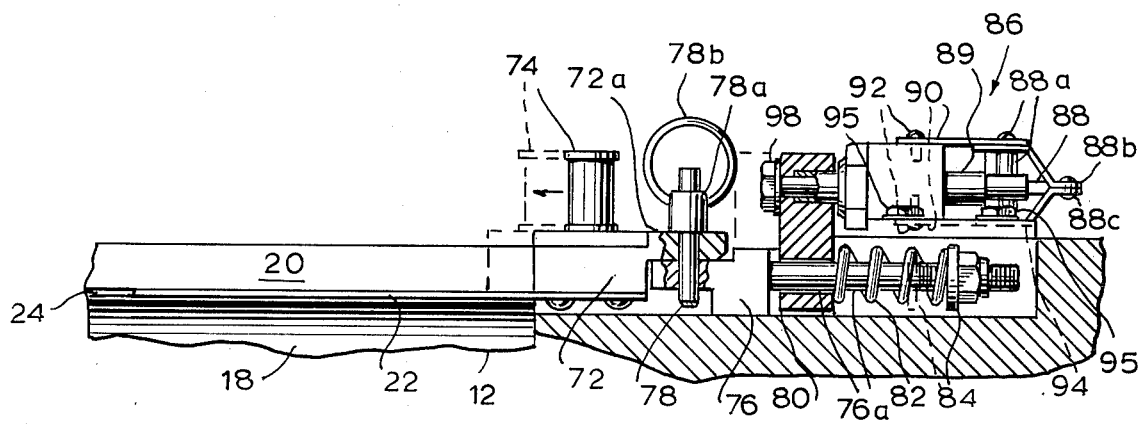
FIG. 8 is a fragmentary side elevation of a portion of a cylinder member and the tension and tension relieving mechanism shown in FIG. 7 and indicating the dotted line position of related elements of the closure means which permit the tension of the closure means to be relieved to enable the folding of the launching system to the compact portable mode illustrated in FIG. 1.

From our understanding of the invention thus far, it will be obvious that the hinged cylinder members 12, 14 and 16 must have provision to relieve the tension of the closure ribbon 22 before the hinged cylinder members can be collapsed to form a compact readily transportable package. To facilitate this and permit the closure ribbon 22 to assume the position indicated in FIG. 4, which incidentally has been exaggerated for greater clarity, a tensioning mechanism 70 shown in FIGS. 7 and 8 has been provided on one end block 71 of the launching system which is situated at one end of the cylinder member 12. The closure ribbon 22, while fixed at the end of the cylinder member 16 in a convenient fashion (not shown), is held under spring tension at the opposite furthermost extremity by the tensioning mechanism 70. The closure ribbon 22 is fastened to the block 72 which is equipped with a spool handle 74 mounted to its upper surface. The block 72 is also provided with an offset leg 72a which is adapted to cooperate with a bearing block 76 to which it is fastened by a pin 78 which passes through a suitable aperture provided for the purpose in both the offset leg 72a and the bearing block 76. The pin 78 is provided with an upper enlarged portion 78a the lower surface of which forms a shoulder that prevents the pin 78 from falling through the apertures in the leg 72a and bearing block 76. A ring 78b fastened to the enlarged portion 78a permits the pin to be grasped for easy removal of the pin 78 from the apertures permitting the end of the closure ribbon 22 to become unrestrained. The bearing block 76 is adapted to slide along the upper surface of the end block 71 and is provided with an adjusting screw 76a which projects from the bearing block 76 in a direction opposite to the closure ribbon 22. The adjusting screw passes through an aperture sufficiently large enough to permit free movement of the adjusting screw which is provided in a positioning member 80. A compression spring 82 encircles the adjusting screw 76a and is disposed between the positioning member 80 and a seating washer 84 which is positioned axially on the adjusting screw 76a by means of nut threadably engaged with the end of the adjusting screw 76a. Thus, the location of the nut on the adjusting screw 76a determines the compression force of the spring so that by rotating the nut one way or the other, the spring will be compressed or decompressed between it and the positioning member 80 thereby tensioning the closure means 22 operatively connected to the spring 82 in the manner described.

To relieve the tension on the closure ribbon 22, a toggle linkage 86 is fixed to the upper surface of the block 71. The toggle linkage 86 is equipped with an actuating handle 88 which when moved to the dotted position shown in FIG. 7, operates the positioning member 80 through associated linkage members that are yet to be described toward the closure ribbon 22 thereby unloading the compression spring 82 and permitting pin 78 to be removed by grasping and pulling the ring 78a and allowing the one end of the closure ribbon 22 to become unfettered.

The aforementioned toggle linkage 86 is essentially what is commonly referred to as an over center linkage and is self locking to maintain the positioning member 80 in a fixed position relative to the end block 71 until the handle 88 is moved to the dotted position. As will be noted in FIG. 8, the toggle linkage assembly is formed with a number of duplicate members spaced apart and arranged one above the other for better load distribution to a centrally located push pull member 89 that is located between them. However, the handle 88 has one end that is bifurcated and an offset bellcrank like portion 88b fastened by a suitable fastener 88c to one end of the push pull member 89. Handle 88 is pivotably connected by pin 88a to connecting links 90. The connecting links 90 are pivotably mounted at their opposite ends on a pair of pins 92 which extend from the upper and lower surfaces of a fixed toggle link member 94 that is fastened to the upper surface of the end block 71 by a plurality of bolts 95. Push pull member 89 extends from the bellcrank end portion 88b to which it is fastened through a suitable bearing (not shown) provided in an upstanding portion of the fixed toggle member 94 and is received in a suitable aperture in the face of the positioning member 80 and is secured thereto by means of a bolt 98 which passes through the positioning member 80 and threadably engages push pull member 89. Thus, when the handle 88 is moved to the dotted position in FIG. 7, the positioning block is moved in the direction of the closure ribbon 22 to the dotted line position shown in FIG. 8 relieving the spring tension and permitting the closure ribbon to become unfettered and permitting the cylinder members to be collapsed. It is noted that the closure ribbon 22 will, when unfettered at one end, rotate approximately 90° on its own axis as shown in FIG. 3 and bend transversely to the plane of its widest dimension. When the launch system 10 is to be restored to its operational condition, the closure ribbon 22 can be reconnected by grasping the spool handle and re-engaging the pin 78 whereafter the handle 88 can be restored to its over center locked (full line) position shown in FIG. 7 by the previously described mechanism restoring the positioning member 80 and spring tension to the closure ribbon 22.

In summary, a brief recapitulation of the operational sequence to erect the launcher to its extended operational condition requires that the cylinder member 12, 14 and 16 be released away from any constraints (not shown) that may have been used to hold the launching system 10 in its collapsed portable condition as shown in FIG. 1. The cylinder member 12 would then be rotated approximately 180° in the direction of the arrow in FIG. 1 about the hinge means 44 and brought into juxtaposition with the cylinder member 14. The tapered alignment pin 68 will engage the tapered aperture 68a on the mating surfaces of the cylinder members and assure the proper alignment of the cylinder members. The swing bolts 58 will be rotated into the bifurcated protuberances 47 and the hex nuts 58a rotated to tighten the bolts 58 against the surfaces of the protuberances 47. Retaining bolt 56 is then threadably engaged in the aperture 54 to lock the cylinder members 12 and 14 together. The same sequence is followed after the cylinder member 16 is rotated in the direction of the arrow in FIG. 1 and brought into juxtaposition with the opposite end of the cylinder member 14 to lock all three of the cylinder members together in the operational launching position. The tension is then restored to the closure ribbon 22 by grasping the spool handle 74 drawing the spool and ribbon tight enough to align the apertures in the offset portion of the member 72a and bearing block 76 and inserting the locking pin 78. The toggle linkage handle 88 is then moved to the solid line position as viewed in FIG. 7 locking the positioning member 80 and restoring the preset spring tension furnished by the compression spring 82 to the closure ribbon 22. To collapse the launching system 10, the reverse order of sequence may be followed.

Although the invention has been described with reference to certain preferred embodiments, it will be understood that variations and modifications may be made within the spirit and scope of the invention as defined in the appended claims.

What is claimed is:

1. A fluid pressure actuated launching system comprising in combination, a plurality of cylinder members, each of said cylinder members having an opening extending longitudinally therewithin and a longitudinal slot communicating with said opening, hinge means situated between said cylinder members and connecting each cylinder member with an adjacent cylinder member such that the longitudinal slot in each cylinder member is positionable thereby to form a substantially continuous longitudinal slot and opening therewithin when said cylinder members are contiguous, tensioned closure means for sealing portions of said longitudinal slot, means connected to said closure means and one of said cylinder members for relieving the tension on said closure means, means for disconnecting said closure means from said means for relieving the tension on said closure means, and a linearly movable piston assembly having a portion thereof in contact with said closure means and linearly movable during ejection and return strokes, an interior portion of said piston assembly being movably disposed within the opening in the cylinder members and having an exterior portion integral with said interior portion and adapted to engage an article to be launched from said launching system.

2. A fluid pressure actuated launching system according to claim 1 wherein said hinge means connecting said cylinders are radially disposed at alternative locations on each successive connected cylinder member.

3. A fluid pressure actuated launching system according to claim 2 wherein said closure means includes a continuous flexible ribbon fixed to one end of said launching system and extending for substantially the entire length thereof.

4. A fluid pressure actuated launching system according to claim 3 wherein said closure ribbon is provided with handle means connected thereto in proximity to said tension relieving means and adapted to facilitate the connection of said closure ribbon to said tension relieving means.

5. A fluid pressure actuated launching system according to claim 4 wherein said tension relieving means includes spring bias means to urge said closure ribbon taut and a toggle linkage connected to said spring bias means.

6. A fluid pressure actuated launching system according to claim 5 wherein at least two of said cylinder members have mating surfaces and the mating surfaces of each of said cylinder members are provided with alignment means adapted to cooperate with one another when said cylinder members are brought into the launch position.

7. A fluid pressure actuated launching system according to claim 6 wherein said hinge means includes locking members adapted to secure said cylinder members in the operative launch position.

* * * * *